United States Patent [19]

Takimoto

[11] Patent Number: 4,965,681
[45] Date of Patent: Oct. 23, 1990

[54] MAGNETIC RECORDING APPARATUS OF ROTARY MAGNETIC TYPE HAVING CROSS-TALK CANCELLING FUNCTION

[75] Inventor: Hiroyuki Takimoto, Kanagawa, Japan

[73] Assignee: Canon Kabushiki Kaisha, Tokyo, Japan

[21] Appl. No.: 320,907

[22] Filed: Mar. 8, 1989

[30] Foreign Application Priority Data

Jun. 12, 1985 [JP] Japan .................................. 60-126223
Jun. 12, 1985 [JP] Japan .................................. 60-126224
Jun. 12, 1985 [JP] Japan .................................. 60-126225
Jun. 12, 1985 [JP] Japan .................................. 60-126226

[51] Int. Cl.⁵ .......................................... G11B 15/14
[52] U.S. Cl. .................................. 360/64; 360/124
[58] Field of Search ............. 360/61, 64, 66, 67, 360/18, 19.1, 33.1, 34.1, 124; 358/328, 330, 340

[56] References Cited

U.S. PATENT DOCUMENTS

| | | | |
|---|---|---|---|
| Re. 23,311 | 12/1950 | Camras | 360/124 |
| 3,585,314 | 6/1971 | Korn | 360/124 |
| 3,986,608 | 6/1961 | Pettus et al. | 360/124 |
| 4,134,126 | 1/1979 | Hirai | 360/34.1 |
| 4,291,352 | 9/1981 | Gooch | 360/124 |
| 4,303,951 | 12/1981 | Hack | 360/124 |
| 4,331,992 | 5/1982 | Klein et al. | 360/124 |
| 4,349,848 | 9/1982 | Ishii et al. | 360/66 |
| 4,369,476 | 1/1983 | Karsh | 360/124 |
| 4,520,405 | 5/1985 | Sasaki et al. | 360/64 |
| 4,542,419 | 9/1985 | Morio et al. | 360/19.1 |
| 4,577,160 | 3/1986 | Lettvin et al. | 360/67 |
| 4,682,245 | 7/1987 | Shibata et al. | 360/19.1 |

OTHER PUBLICATIONS

Hennis, R. B., "Cross Channel Coupling", IBM TDB, vol. 1, No. 5, Feb. 1959, p. 26.

*Primary Examiner*—Vincent P. Canney
*Attorney, Agent, or Firm*—Robin, Blecker, Daley & Driscoll

[57] ABSTRACT

A magnetic recording apparatus of the rotary head type has a cross-talk cancelling function. A plurality of rotary magnetic heads are used to record signals on a magnetic recording medium and a correction signal is formed by using a record signal which is being fed to any one rotary magnetic heads among the rotary magnetic heads to which the record signal is fed during a period, when the record signal is being fed through different rotary transformers, to at least two rotary magnetic heads among the plurality of rotary magnetic heads, and the correction signal thus formed is used to correct the record signal fed to the other rotary magnetic head. As a result, the cross-talk component which may be produced in the record signal between the rotary transformers located at different positions can be effectively removed.

12 Claims, 12 Drawing Sheets

FIG.4

| STANDARD SPEED 30PG | | | |
|---|---|---|---|
| $I_{Lb1}$ | 0 | $-\Delta I_L$ | OUTPUT CURRENTS OF RECORDING AMPLIFIERS |
| $I_{La1}$ | 0 | $I_L$ | |
| $I_{Rb1}$ | $-\Delta I_R$ | $-\Delta I_L$ | |
| $I_{Ra1}$ | $I_R$ | 0 | |
| $I_{Lb2}$ | 0 | $-\Delta I_L + \Delta I_L = 0$ | INPUT CURRENTS OF HEADS |
| $I_{La2}$ | 0 | $I_L$ | |
| $I_{Rb2}$ | $-\Delta I_R + \Delta I_R = 0$ | $-\Delta I_L + \Delta I_L = 0$ | |
| $I_{Ra2}$ | $I_R$ | 0 | |
| HALF SPEED | | | |
| $I_{Lb1}$ | $I_L$ | 0 | OUTPUT CURRENTS OF RECORDING AMPLIFIERS |
| $I_{La1}$ | $-\Delta I_L$ | $-\Delta I_R$ | |
| $I_{Rb1}$ | 0 | $I_R$ | |
| $I_{Ra1}$ | 0 | $-\Delta I_R$ | |
| $I_{Lb2}$ | $I_L$ | 0 | INPUT CURRENTS OF HEADS |
| $I_{La2}$ | $-\Delta I_L + \Delta I_L = 0$ | $-\Delta I_R + \Delta I_R = 0$ | |
| $I_{Rb2}$ | 0 | $I_R$ | |
| $I_{Ra2}$ | 0 | $-\Delta I_R + \Delta I_R = 0$ | |

FIG.13
FIG.14
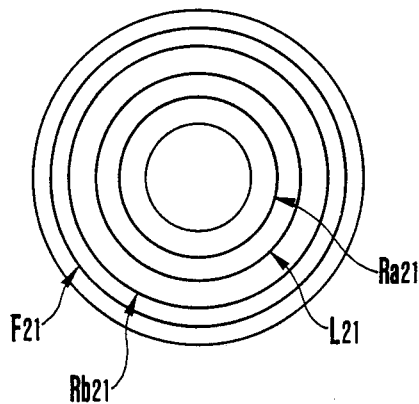
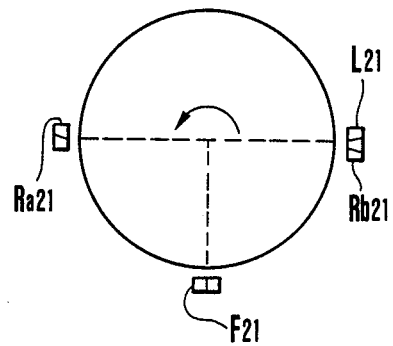
FIG.15
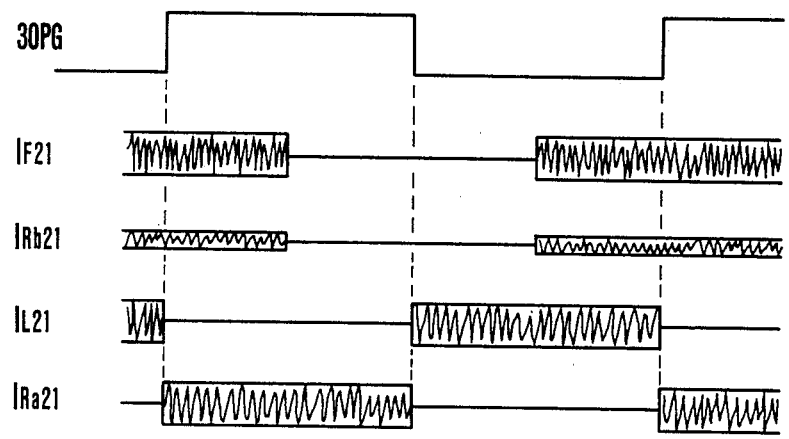

F I G.22
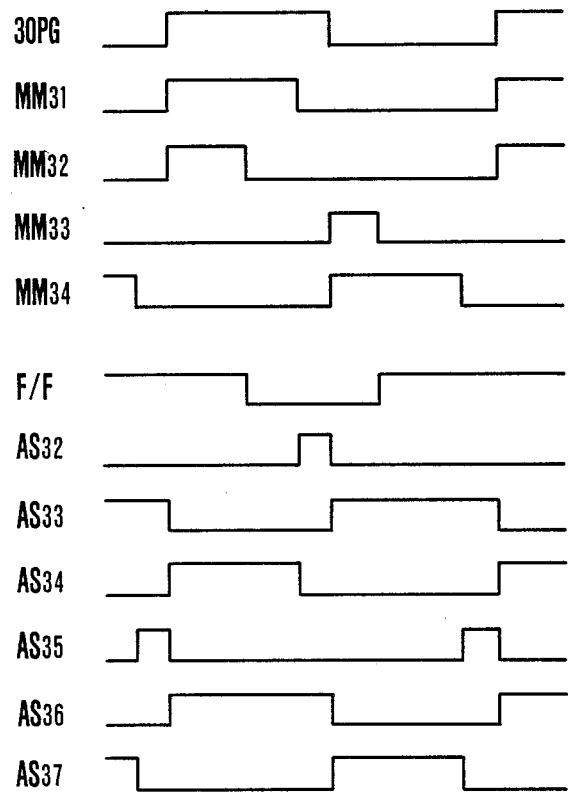

MAGNETIC RECORDING APPARATUS OF ROTARY MAGNETIC TYPE HAVING CROSS-TALK CANCELLING FUNCTION

This application is a continuation of application Ser. No. 873,507, filed June 12, 1986, now abandoned.

BACKGROUND OF THE INVENTION:

1. Field of the Invention:

This invention relates to a magnetic recording apparatus having a plurality of magnetic heads mounted on a rotary drum.

2. Description of the Related Art:

The known apparatuses of the above-stated kind include video tape recorders (hereinafter referred to as VTR's). Recently, the size of VTR's has been reduced to a great extent. The helical scanning type VTR's of the so-called VHS type and β type have been commercialized in varied forms including a portable tape deck and a VTR combined in one body with a camera. Further, the so-called 8 mm VTR's using a tape measuring 8 mm in width have been also commercialized. In the case of the 8 mm VTR, the rotary drum measures only about 40 mm. Some of the commercialized 8 mm VTR's are capable of recording and reproducing at a track pitch which is ½ of the ordinary track pitch.

In carrying out recording or reproduction with a VTR, the tape can be allowed to travel at varied speeds including a standard speed and a speed half of the standard speed. The half tape speed is used for increasing the recordable amount of the tape by two times. However, if two heads are arranged for recording or reproduction at the half tape speed in addition to two heads provided for recording or reproduction at the standard tape speed, the VTR must be provided with a rotary transformer of four channels.

In the case where the VTR includes a magnetic head for special reproduction purpose, a flying magnetic erasing head (hereinafter referred to as FEH) and the like, in addition to two recording/reproducing heads, a multi-channel rotary transformer is required. With the diameter of the rotary drum becoming smaller, the diameter of the rotary transformer also becomes smaller. Then, in accordance with the arrangement of the conventional VTR, it is difficult to reduce the cross-talk which takes place among the channels of the rotary transformer. The cross-talk takes place during both recording and reproduction. Assuming that a recording operation is performed with four heads arranged as mentioned above, for example, at the standard tape speed, some portion of the recording signal current to be supplied to the heads for the standard tape speed flows also to the heads provided for the half tape speed. In the event of excessive cross-talk, the recording signals would be degraded thereby. Particularly, in the case where a signal recorded on a tape is to be erased, by using the above-mentioned FEH, it is required to supply an erasing current, which is larger than the recording current, to the FEH, and consequently more cross-talk tends to take place through the rotary transformer.

In the case of the 8 mm VTR, a PCM (signal recording) area is prescribed to be provided on a magnetic recording medium apart from a video (signal recording) area for recording and reproduction of a digital audio signal which is time compressed and obtained by pulse-code modulating an audio signal. During recording, while one head is recording the signal in the PCM area, another head records a video signal in the video area at the same time. In the event of excessive cross-talk of the rotary transformer, the quality of record is degraded both in the picture and the sound as the recording video and PCM audio signals are affected by the cross-talk.

SUMMARY OF THE INVENTION:

It is an object of this invention to provide a magnetic recording apparatus which is capable of adequately recording signals on a magnetic recording medium with a plurality of rotary type magnetic heads without being affected by cross-talk among the magnetic heads.

It is another object of this invention to provide a magnetic recording apparatus which is capable of adequately recording signals on a magnetic recording medium with a rotary type erasing head and a plurality of rotary type magnetic heads without being affected by cross-talk between the erasing head and the magnetic heads.

It is a further object of this invention to provide a magnetic recording apparatus wherein, in recording signals on a magnetic recording medium with a plurality of rotary type magnetic heads, the signals to be recorded on the recording medium can be prevented from being degraded by any adverse effect of the rotary type magnetic heads other than the one being supplied with recording signals.

Under this object, a magnetic recording apparatus arranged as an embodiment of this invention to record signals on a magnetic recording medium with rotary type magnetic heads comprises a plurality of rotary magnetic heads; recording signal generating means arranged to supply at least one of the plurality of magnetic heads with a recording signal corresponding to an information signal; phase inverted recording signal generating means arranged to supply a phase inverted recording signal which is of a phase opposite to that of the recording signal generated by the recording signal generating means to at least one of the magnetic heads other than the magnetic head to which the recording signal is supplied from the recording signal generating means; and coupling means for electrically coupling the plurality of rotary magnetic heads, the recording signal generating means and the phase inverted recording signal generating means with each other.

The above and further objects and features of this invention will become apparent from the following detailed description of preferred embodiments thereof taken in connection with the accompanying drawings.

BRIEF DESCRIPTION OF THE DRAWINGS:

FIG. 4 is a timing chart showing the operation of the VTR of FIG. 1.

FIG. 13 is an illustration of the channel arrangement of a rotary transformer included in the VTR of FIG. 12.

FIG. 14 is an illustration of magnetic heads arranged on a rotary drum included in the VTR of FIG. 12.

FIG. 15 is a timing chart showing the operation of the VTR of FIG. 12.

FIG. 22 is a timing chart showing the outputs of various parts of the essential parts of the VTR shown in FIG. 21.

Figure 1:
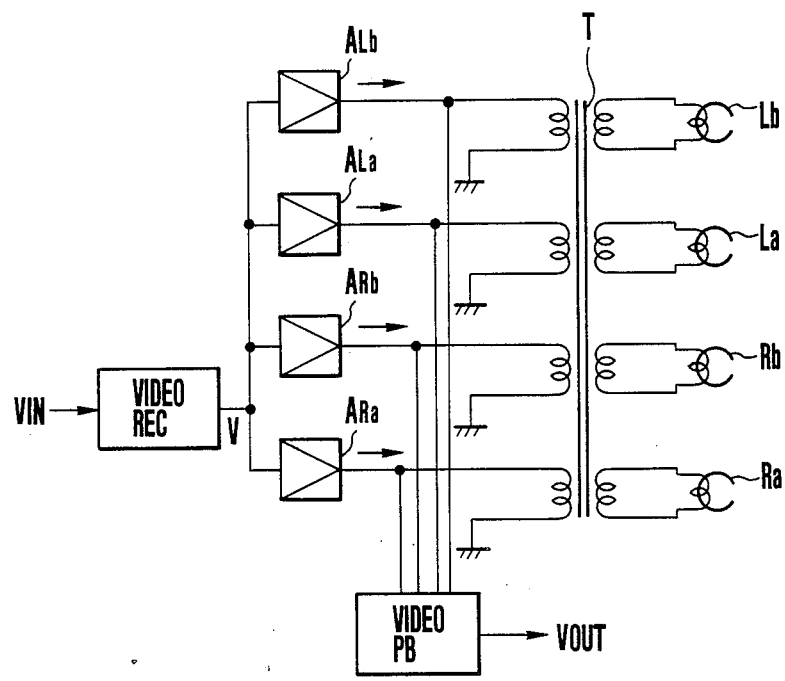
FIG. 1 is a circuit diagram showing the essential parts of a VTR arranged as an embodiment of this invention.
Figure 2:
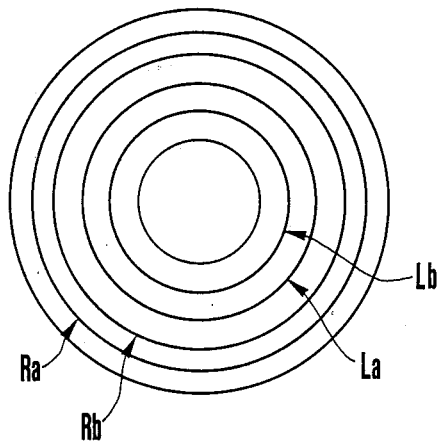
FIG. 2 is an illustration of the channel arrangement of a rotary transformer employed in the VTR of FIG. 1.
Figure 3:
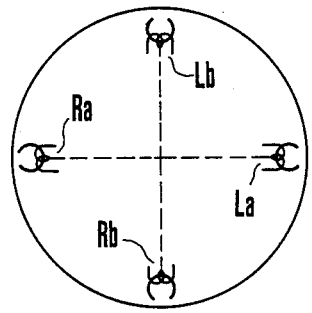
FIG. 3 is an illustration of the mounting positions of heads on a rotary drum included in the VTR of FIG. 1.

DETAILED DESCRIPTION OF THE PREFERRED EMBODIMENTS:

An embodiment of this invention is arranged as described below:

FIG. 1 shows the essential parts of this embodiment in a circuit diagram. This embodiment is provided with four heads including two heads La and Ra for recording or reproduction at a standard tape speed and two heads Lb and Rb for recording or reproduction at a half tape speed. FIG. 2 shows the arrangement of the channels of a rotary transformer shown in FIG. 1. FIG. 3 shows the positions of the four heads mounted on a rotary drum of the same embodiment. Referring to these FIGS. 1, 2 and 3, the illustrations include a rotary transformer T; recording amplifiers ALa, ALb, ARa and ARb which are arranged within a recording circuit. In recording at the standard tape speed, a half-period portion of a recording current is supplied to each of the heads La and Ra while the drum makes one turn. Now, it is assumed that a recording current produced from the recording amplifier is IRa1 and a current $\Delta IRa2$ is caused to leak to the head RN due to cross-talk produced at the rotary transformer by feeding such current IRa1 to the rotary transformer. Then, when a current corresponding to $-\Delta IRa2$, obtained by inverting the phase of $\Delta IRa2$, is produced from the amplifier ARb and fed to the head Rb through the rotary transformer, the recording currents IRa2 and $-\Delta IRa2$ are simultaneously fed to the head Rb, with the result that the recording current applied to the head Ra becomes $\Delta IRa2+(-\Delta IRa2)=0$, whereby the current caused to leaks to the head Rb due to cross-talk is cancelled. Further, in recording with the head La using the recording amplifier ALa, leak currents flows to both the heads Lb and Rb. Therefore, in that event, a current $-\Delta ILa$ is likewise produced from each of the recording amplifiers ALb and ARb.

The timing chart of FIG. 4 shows the recording currents ILa1, ILb1, IRa1 and IRb1 and recording currents ILa2, ILb2, IRa2 and IRb2 flowing to the heads La, Lb, Ra and Rb from the recording amplifiers ALa, ALf, ARa and ARf in recording at the standard tape speed and also at the half tape speed. FIG. 4 also shows a head change-over signal 30PG which is generated according to the rotation phase of the drum. This signal 30PG is arranged to be shiftable to a degree corresponding to a difference in the mounting angle between the pair of heads Ra and La and another pair of heads Rb and Lb according to recording/reproduction at the standard tape speed or recording/reproduction at the half tape speed.

Figure 5:
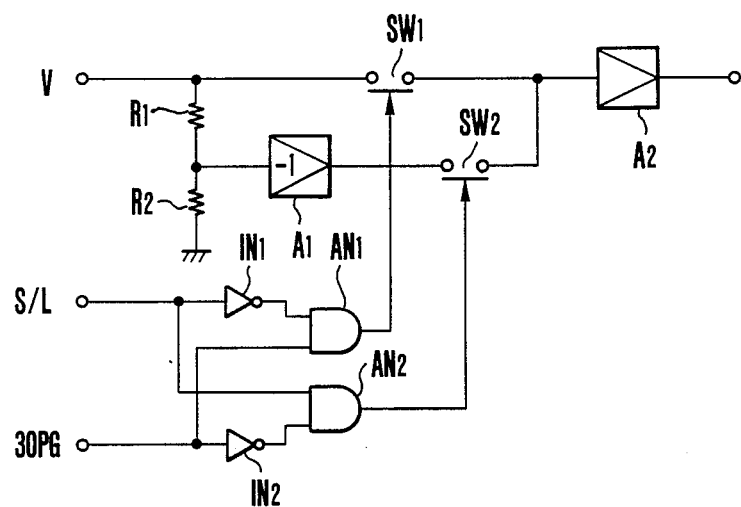
FIGS. 5, 6, 7 and 8 are circuit diagrams showing the internal circuit arrangement of recording amplifiers included in the VTR of FIG. 1.

FIG. 5 shows in outline the internal arrangement of the recording amplifier ALb. A reference symbol V denotes, in the case of an 8 mm VTR for example, a mixed signal consisting of a frequency modulated luminance signal, low-zone converted chrominance signals, a frequency modulated audio signal and pilot signals for tracking control to be performed at the time of reproduction. A symbol S/L denotes a control signal the level of which becomes high in the standard tape speed recording mode and low in the event of the half tape speed recording mode. Resistors R1 and R2 are arranged to effect attenuation to a degree corresponding to cross-talk. The illustration includes a phase inverting circuit A1; a recording amplifier A2 which has its output terminal connected to the L channel stator of a rotary transformer T; analog switches SW1 and SW2 each of which is arranged to turn on when a control input coming thereto is at a high level and to turn off when it is at a low level; inverters IN1 and IN2; and AND circuits AN1 and AN2.

With the recording amplifier ALb arranged as described above, in the half tape speed recording mode, the switch SW1 closes when the head change-over signal 30PG becomes a high level. Then, a head current IL flows from the recording amplifier A2. In the case of the standard tape speed recording mode, the switch SW2 closes when the signal 30PG is at a low level to give a head current $-\Delta IL+\Delta IL=0$.

Figure 6:
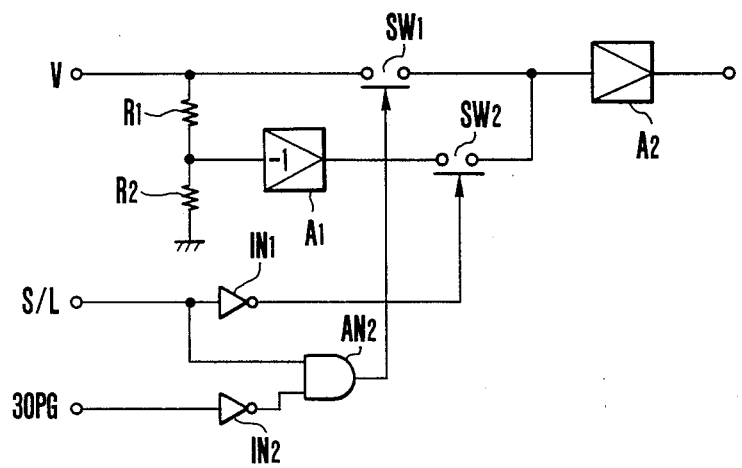
Figure 7:
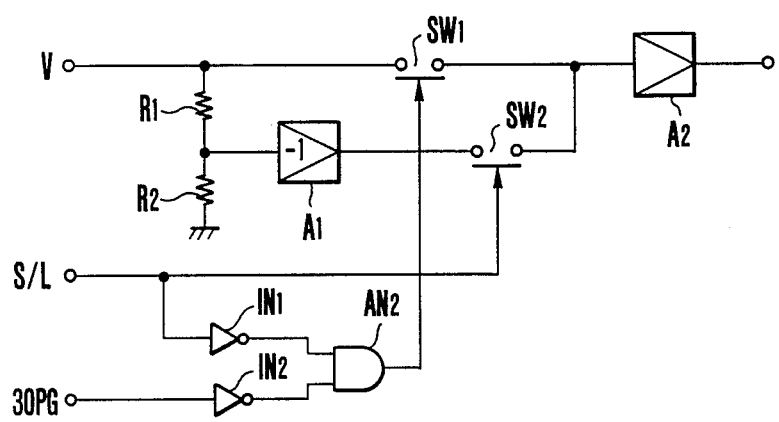
Figure 8:
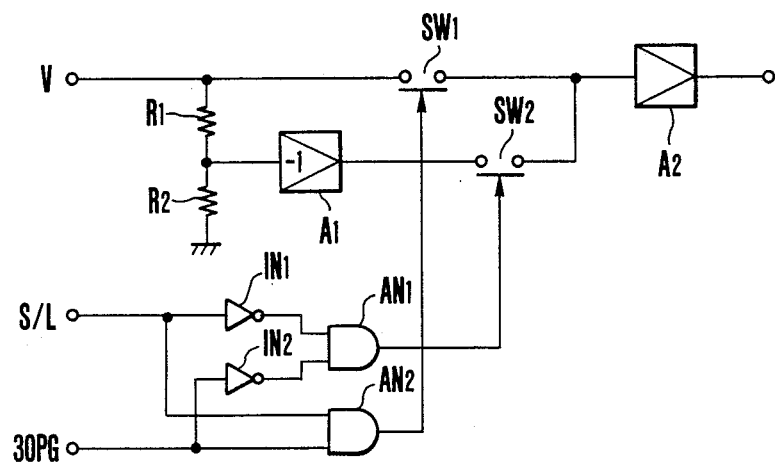

FIG. 6 is a circuit diagram showing in outline the internal arrangement of the recording amplifier ALa. FIG. 7 shows in outline the internal arrangement of the recording amplifier ARb. FIG. 8 shows in outline the internal arrangement of the recording amplifier ARa. In FIGS. 6, 7 and 8, reference symbols which are the same as those of FIG. 5 indicate parts either the same as or equivalent to those shown in FIG. 5 in terms of functions.

Figure 9:
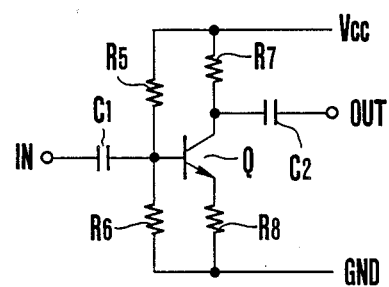
FIG. 9 is a circuit diagram showing the arrangement of a phase inverting circuit shown in FIG. 1.

FIG. 9 is a circuit diagram showing by way of example the arrangement of the phase inverting circuit. The illustration includes a transistor Q; resistors R5, R6, R7 and R8; and capacitors C1 and C2. The circuit is arranged to have approximately flat frequency characteristic for the band of the incoming signal.

In the specific embodiment described above, the heads other than the heads receiving the recording signal are arranged to perform recording at a different tape speed from the tape speed at which recording is performed by the heads presently receiving the recording signal. However, these heads not receiving the recording signal may be considered to be so-called special reproducing heads.

As described in the foregoing, this embodiment is arranged to prevent the signal to be recorded from being degraded by the adverse effect of magnetic heads other than the heads presently receiving the recording signal with these heads all mounted on one and the same rotary drum.

Figure 10:
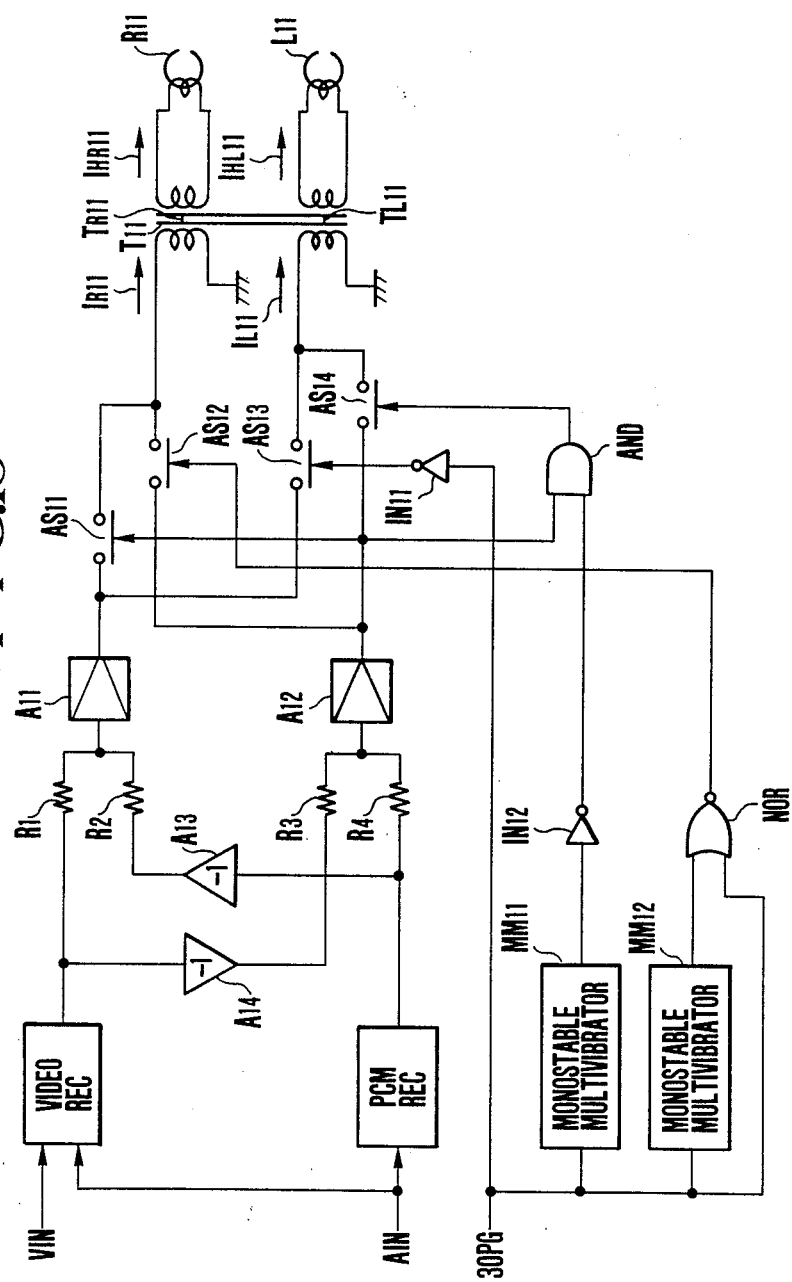
FIG. 10 is a circuit diagram showing the essential parts of a VTR arranged as another embodiment of this invention.
Figure 11:
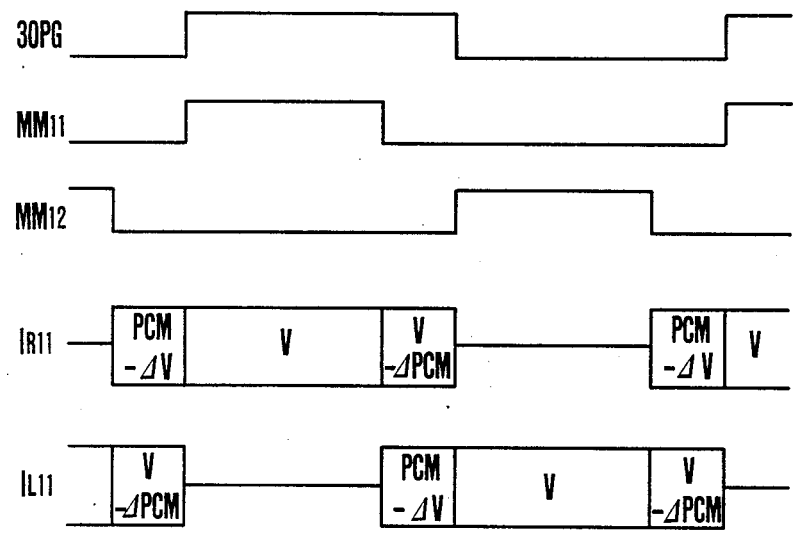
FIG. 11 is a timing chart showing the operation of the VTR shown in FIG. 10.

FIG. 10 is a circuit diagram showing an 8 mm VTR arranged according to this invention as a further embodiment thereof. FIG. 11 is a timing chart showing the operation of the same VTR. Referring to FIG. 10, an information signal processing circuit VIDEO REC is arranged to form an information signal to be recorded by processing recording video and audio signals in accordance with the 8 mm format, that is, by frequency modulating the luminance signal; by low zone converting the chrominance signal; and by frequency modulating the audio signal with the modulation centered on 1.5 MHz.

Further, the information signal to be recorded also includes pilot signals for tracking control. A PCM signal processing circuit PCM REC is arranged to generate a recording PCM audio signal which is obtained by pulse code modulating and time compressing an audio signal and is recorded in front of a video signal recording area. The illustration includes a rotary transformer T11; resistors R1 to R4 which are arranged to have their ratios R1/R2 and R4/R3 determined according to the amount of the cross-talk taking place at the rotary transformer T11; amplifiers A11 and A12; switches AS11 to AS14 each of which is arranged to turn on when a control input is received at a high level; inverters IN11 and IN12; an AND gate AND; a NOR gate NOR; a monostable multivibrator MM11 which is arranged to be triggered by a rising edge of an input signal; a monostable multivibrator MM12 which is arranged to be triggered by a falling edge of an input signal; a head change-over rectangular wave signal 30PG is arranged to effect change-over between heads and is synchronized with the rotation phase of the drum which is not shown; current IR and IL are arranged to be supplied to rotary transformers TR11 and TL11 which correspond respectively to the channels of heads R11 and L11; and recording currents IHR11 and IHL11 which flow to the heads R11 and L11 respectively.

Referring to FIG. 11, at parts IR11 and IL11, reference symbols PCM and V denote the above-stated PCM audio signal and the video signal V which are to be recorded as information signals; and symbols $-\Delta V$ and $-\Delta PCM$ denote signals obtained by inverting the phase of information signals to be recorded by other heads and by controlling their levels according to the cross-talk taking place at the rotary transformers respectively.

In the VTR which is arranged as described above, when the output of the monostable multivibrator MM11 is at a high level, the current IR11 consists of only the signal V while the current IL11 is in a state of IL11=0. When the output level of the monostable multivibrator MM11 becomes low, the PCM signal is recorded by the current IL11. The recording signal mixes in the current IHR11 flowing to the head R11. This mixing portion of signal is assumed to be a signal $\Delta PCM$. Meanwhile, a signal $V+(-\Delta PCM)$ is supplied to the current IR11. As a result, the current IHR11 comes to be expressed as $IHR11 = V + (-\Delta PCM) + \Delta PCM = V$. Therefore, the cross-talk from the rotary transformer T11 can be cancelled. The same condition obtains also for the head L11. In other words, a relation IHL11=PCM obtains under the condition $IL11 = PCM + (-\Delta V)$. After that, the heads L11 and R11 are likewise changed over in a repeating manner. Further, in FIG. 10, phase inverting circuits A13 and A14 are arranged in the same manner as the circuit shown in FIG. 9 and thus require no further description.

In the magnetic recording apparatus according to this invention as described above, the inverted information signal which is obtained by inverting the phase of the information signal to be recorded by one head is mixed with the information signal to be recorded by the other head. This arrangement effectively prevents signal deterioration due to cross-talk among a plurality of heads in cases where different information signals are to be simultaneously recorded by these heads.

Figure 12:
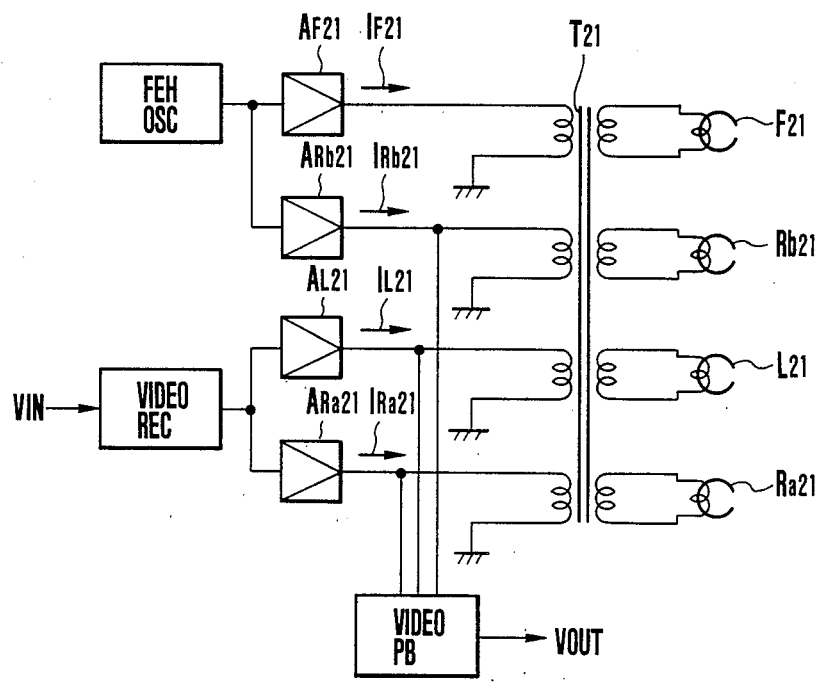
FIG. 12 is a circuit diagram showing the essential parts of a VTR arranged as a further embodiment of this invention.

FIG. 12 shows in a block diagram the essential parts of a VTR arranged as a further embodiment of this invention. FIG. 13 shows the channel arrangement of the rotary transformer of the VTR of FIG. 12. FIG. 14 shows the arrangement of magnetic heads mounted on a rotary drum of the same VTR. In FIGS. 12 and 14, the illustrations include an FEH F21; magnetic heads Ra21 and L21 which are arranged to perform recording and reproduction also for a PCM signal in addition to a video signal and has different azimuth angles; and a special reproduction head Rb21 which has the same azimuth angle as the head Ra21. The illustration in FIG. 12 further includes a rotary transformer T21; amplifiers AF21, ARb21, AL21 and ARa21 which are provided for recording by these magnetic heads; currents IF21, IR21, IL21 and IRa21 which are produced by these amplifiers for recording; an oscillation circuit FEH OSC which is arranged to produce an erasing signal to be supplied to the FEH F21; and a signal processing circuit VIDEO REC which is arranged to convert a recording video signal VIN into a recording signal.

With the VTR arranged as described above, recording is performed as follows: Concurrently or in synchronism with the rotation of a rotary drum, a 30PG signal which is a magnetic head change-over signal indicative of the rotation phase of the magnetic heads causes a recording current to be supplied alternately to the magnetic heads Ra21 and L21. This flow of the recording current is as shown in a timing chart in FIG. 15. In the case of magnetic head arrangement as shown in FIG. 14, an erasing current is supplied to the FEH F21 either constantly or as shown at an output current IF21 shown in FIG. 15. The cross-talk at the rotary transformer T21 would cause this output current IF21 to flow not only to the FEH F21 but also to the magnetic head Rb21 to bring about the problem as mentioned in the foregoing. To solve this problem, another current IRb21 corresponding to the cross-talk of the current IF21 to the magnetic head Rb21 is supplied at a phase opposite to the current IF21 produced from the recording amplifier ARb21. This current of opposite phase IRb21 effectively cancels out the cross-talk of the current IF21 from the current for the magnetic head Rb21 as shown in the timing chart of FIG. 15.

Figure 16:
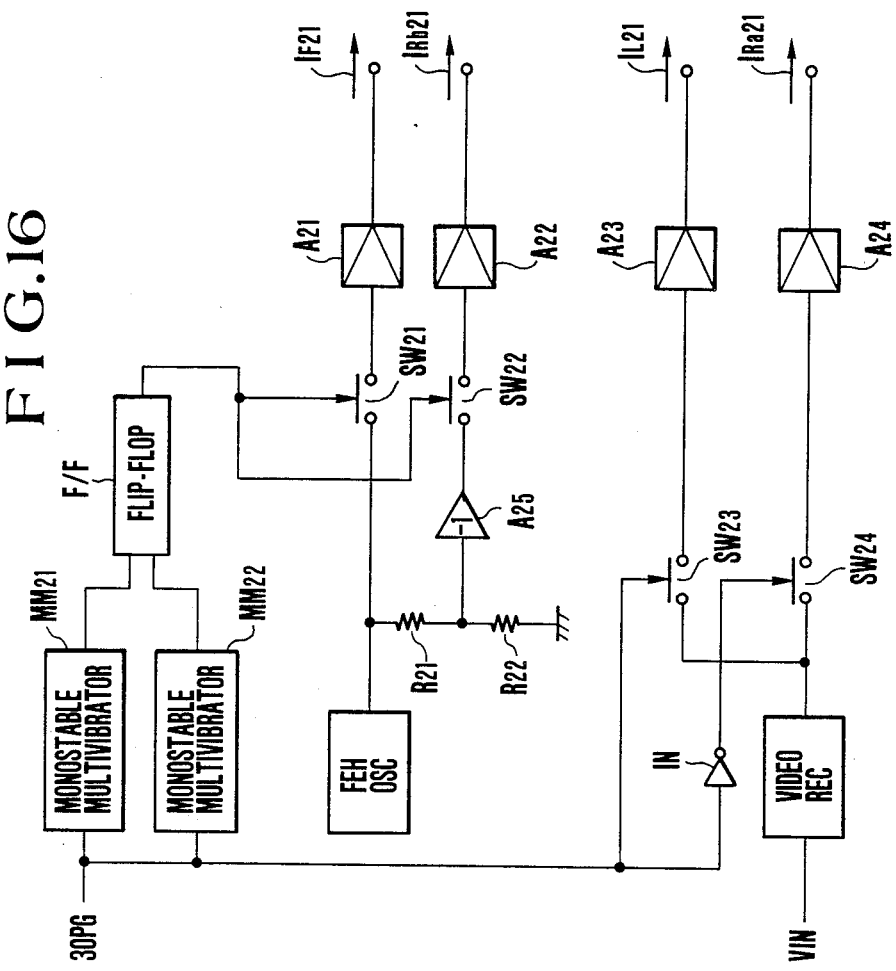
FIG. 16 is a diagram showing the details of amplifiers arranged in the VTR of FIG. 12 to accomplish the operation shown by the timing chart of FIG. 15.

For the operation as shown in this timing chart, the amplifiers AF21, ARb21, AL21 and ARa21 are arranged as shown in outline in FIG. 16 which is a block diagram. The illustration of FIG. 16 includes monostable multivibrators MM21 and MM22; a flip-flop F/F; analog switches SW23 and SW24 which are arranged to turn on when control inputs are at a high level and to turn off when these inputs are at a low level; amplifiers A21 to A24; resistors R21 and R22 which jointly form a voltage dividing circuit; a phase inverting circuit A25; and an inverter IN. The same reference symbols as those shown in FIG. 12 indicate parts which are either the same or equivalent to the corresponding parts of FIG. 12.

With the amplifiers arranged as shown in FIG. 16, the VTR operates as follows: When the signal 30PG is at a high level, the two monostable multivibrators MM21 and MM22 and the flip-flop F/F cause the switches SW21 and SW22 to close during the first half of a process. With the switches thus closed, the FEH receives an erasing signal while the magnetic head Rb21 receives a current which is in an amount corresponding to the cross-talk amount of the erasing signal leaking to the magnetic head Rb21 and is at a phase opposite to the phase of the erasing signal. During the latter half of the process, the switches SW21 and SW22 open to cut off the flows of currents IF21 and IRb21. Meanwhile, the switch SW23 is open and the switch SW24 closes to allow the current IRa21 to flow for recording.

In case that the signal 30PG is at a low level, the two monostable multivibrators MM21 and MM23 and the flip-flop F/F cause the switches SW21 and SW22 to open to prevent the currents IF21 and IRb21 from flowing during the first half of the process. Then, during the latter half of the process, the switches SW21 and SW22 close to supply the magnetic head Rb21 with a current which corresponds to the amount of cross-talk of the erasing signal to the head Rb21 and is obtained by reversing the phase of the erasing signal. In this instance, the switch SW24 turns off and the switch SW23 turns on to allow the current IL21 to flow for recording. Further, in FIG. 16, a phase inverting circuit A25 shown by way of example is equivalent to the circuit of FIG. 9 and is, therefore omitted from description here.

In the embodiment described above, the channel of the rotary transformer which is adjacent to the channel for the erasing head (FEH) is arranged to be used for the special reproduction head Rb21. However, this channel may be arranged to be used for some other head. For example, in cases where different recording-/reproducing heads are provided for different track pitches as mentioned in the foregoing and a channel of the rotary transformer provided for a recording/reproducing head for a track pitch other than a presently recording track pitch is arranged to be next to the channel for the FEH, the same advantageous effect as the effect described above is also attainable by supplying that channel with the output of the phase inverting circuit.

The magnetic recording apparatus arranged as described above as an embodiment of this invention is provided with the phase inverting circuit for inverting the phase of the erasing signal to be supplied to the flying erase head (or FEH). Thus, during recording, an inverted erasing signal which is obtained by inverting the phase of the erasing signal is arranged to be supplied at least one of the magnetic heads which is receiving no information signal. Therefore, the erasing signal can be prevented from rendering operative any magnetic head that is not receiving the information signal, so that the information signal to be recorded will never be degraded thereby.

Figure 17:
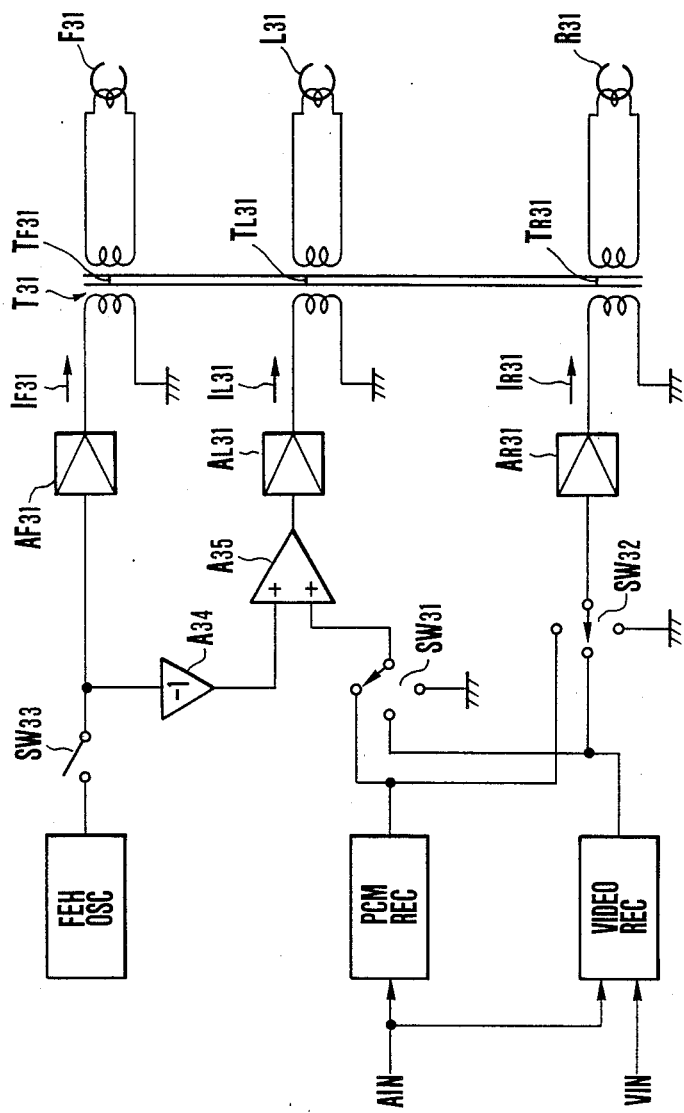
FIG. 17 is a circuit diagram showing the arrangement of a VTR embodying this invention as a further embodiment.
Figure 18:
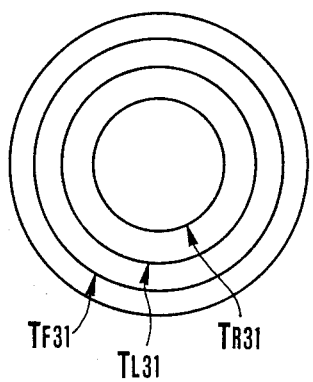
FIG. 18 is an illustration of the channel arrangement of a rotary transformer employed in the VTR of FIG. 17.
Figure 19:
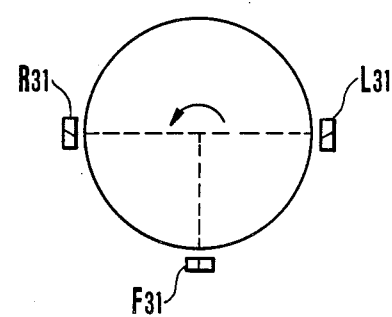
FIG. 19 is an illustration of head mounting positions on a rotary drum included in the VTR of FIG. 17.
Figure 20:
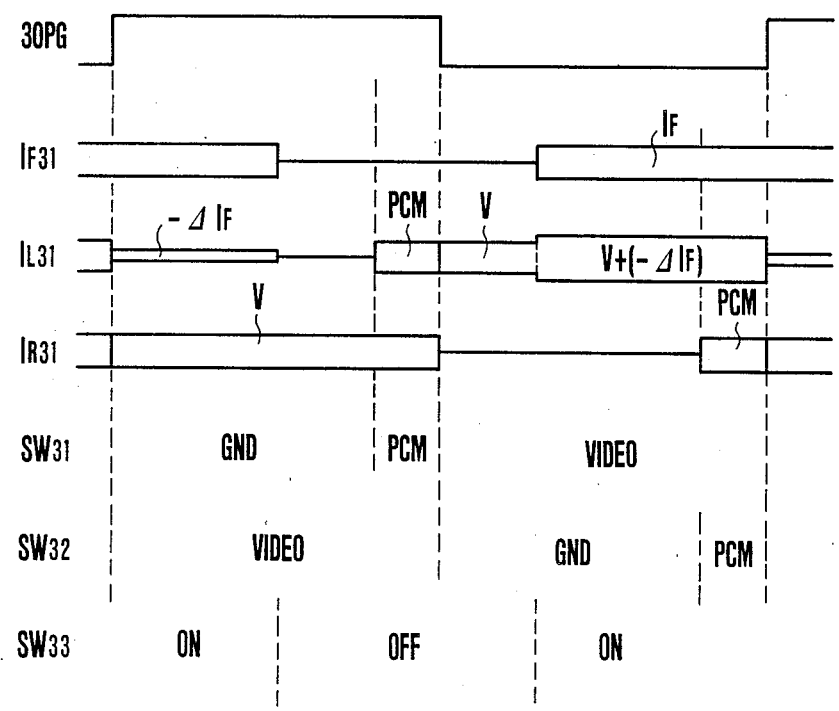
FIG. 20 is a timing chart showing the operation of the VTR of FIG. 17.

FIG. 17 shows in a block diagram a VTR arranged as a further embodiment of this invention. FIG. 18 shows the channel arrangement of a rotary transformer included in the same embodiment. FIG. 19 shows the positions of magnetic heads and an FEH which are mounted on a rotary drum of the same embodiment. FIG. 20 is a timing chart showing the operation of the same embodiment.

Referring to FIGS. 17, 18 and 19, the illustrations include the FEH and magnetic heads F31, L31 and R31; the channels TF31, TL31 and TR31 of a rotary transformer T31; an oscillation circuit FEH OSC arranged to produce an erasing signal for the FEH; a PCM signal processing circuit arranged to form a recording PCM audio signal by pulse code modulating an audio signal AIN to be recorded; an information signal processing circuit VIDEO REC arranged to convert a video signal VIN and the audio signal AIN which are to be recorded into a signal form suited for recording; amplifiers AF31, AL31 and AR31; a phase inverting circuit A34; a mixing circuit A35; change-over switches SW31 and SW32; a switch 33; and currents IF31, IL31 and IR31 which are produced from the amplifiers AF31, AL31 and AR31 and are supplied to the channels TF31, TL31 and TR31 of the rotary transformer respectively.

The video signal VIN and the audio signal AIN are supplied to the signal processing circuit VIDEO REC to be processed in accordance with the format for an 8 mm VTR. More specifically, the luminance signal is frequency modulated. The chrominance signal is low zone color converted. The audio signal is frequency modulated by centering it on 1.5 MHz. A recording information signal is thus obtained through this processing circuit VIDEO REC. Further, in this recording information signal are included known pilot signals for tracking control.

The PCM signal processing circuit PCM REC receives and pulse-code-modulates the incoming audio signal. After that the circuit PCM REC time compresses the signal to produce a PCM audio signal which is to be recorded in front of a video area.

Next, referring to the timing chart of FIG. 20, the embodiment shown in FIG. 17 operates as follows: The head change-over signal 30PG is in synchronism with the rotation of the rotary drum. While the signal 30PG is at a high level, the head R31 is abutting on a video signal recording area of a magnetic recording medium. While the signal 30PG is at a low level, it is the head L31 that is abutting on the video signal recording area. The rotary transformer is provided with channels which are arranged in the order of, from outside, a channel TF31 for the FEH, a channel TL31 for the head L31 and another channel TR31 for the head R31 as shown in FIG. 18. Such being the arrangement of the channels, there arises the question of cross-talk from the channel for the FEH to the channel for the head L31 during recording. In view of this, during the period of flow of the erasing current IF31, a signal $-\Delta IF$ which corresponds to the amount of the cross-talk and is obtained by inverting the phase of the current IF31 is mixed into the recording current IL31 for the head L31 via the mixing circuit A35. Therefore, in the recording current flowing to the head L31, a portion of current $\Delta IF$ due to the cross-talk can be cancelled out. In other words, during a period after the level of the signal 30PG becomes high and before the end of the supply of the erasing current to the FEH, the current IL31 has the signal $-\Delta IF$ mixed therein. After that, when the head L31 reaches a PCM (signal recording) area, the PCM signal is alone applied to the head. Further, when the head reaches the video (signal recording) area, the signal V is applied to the head. Following that, when the supply of the erasing current to the FEH begins, a signal $V + (-\Delta IF)$ is applied to the head L31. Then, when the head passes the video area, the signal $-\Delta IF$ is again applied to the head. Therefore, assuming that the head L31 is in the video area when the FEH is turned on, a current which actually flows to the head L31 can be expressed as $V+(-\Delta IF)+-\Delta IF=V$. The cross-talk portion from the rotary transformer thus can be cancelled out.

The timing chart of FIG. 20 also shows the operating states of the change-over switches SW31 and SW32 and the switch SW32 which are operated for the purpose of change-over from one recording current to another. In the illustration of the change-over switches SW31 and SW32 in the timing chart, a reference symbol PCM denotes that they are connected directly to the circuit PCM REC; a symbol VIDEO denotes that they are connected to the circuit VIDEO REC; and a symbol GND denotes that they are in a state of receiving no signal and are not connected to any of the circuits PCM REC and VIDEO REC.

Figure 21:
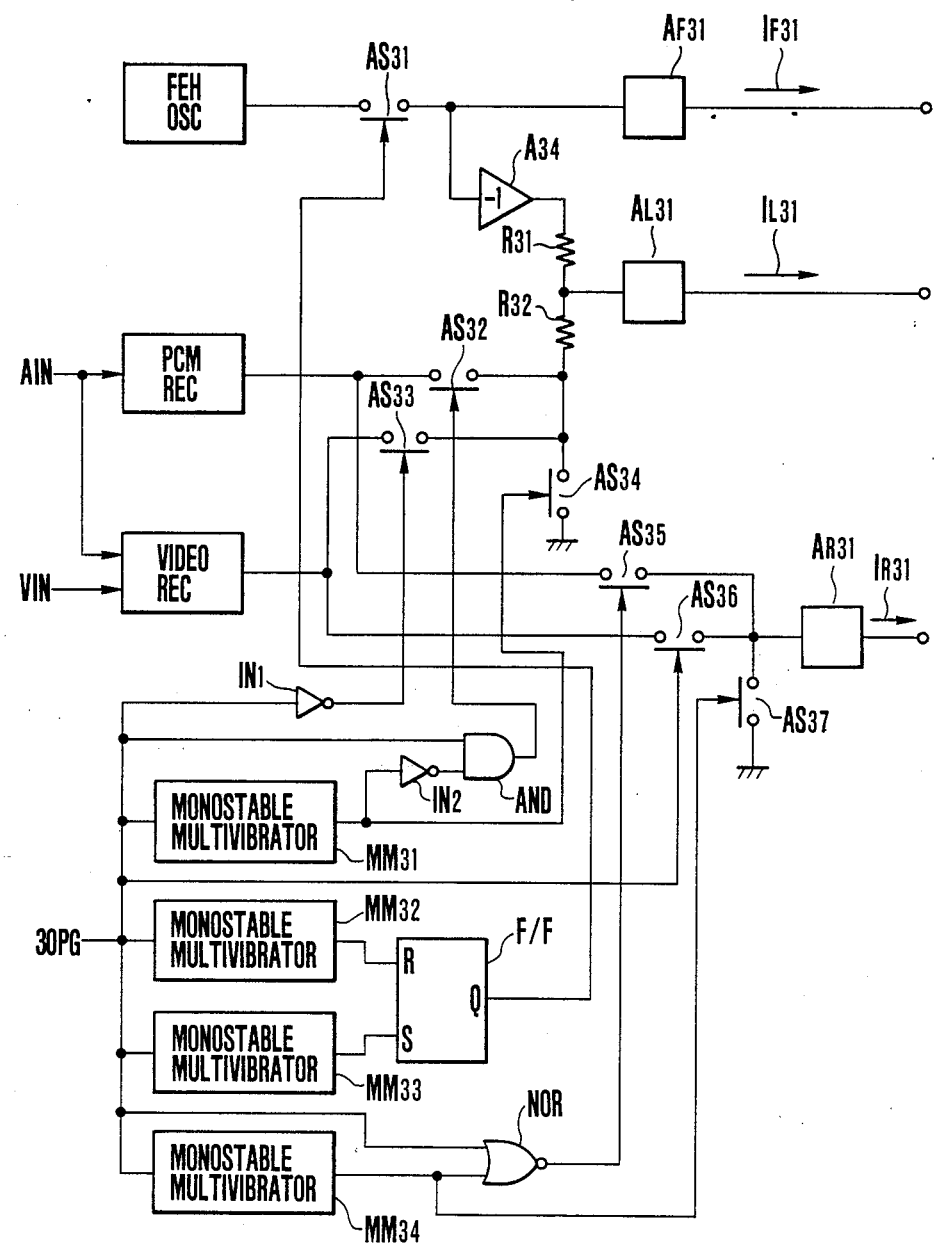
FIG. 21 is a circuit diagram showing the details of the essential parts of the VTR of FIG. 17.

The details of this change-over circuit are as described below with reference to FIGS. 21 and 22:

FIG. 21 is a block diagram showing the details of the essential parts of the VTR according to this invention. FIG. 22 is a timing chart showing the operation of the VTR of FIG. 21. Referring to FIG. 21, analog switches AS31 to AS37 are arranged to turn on when control inputs are at a high level and to turn off then the control inputs are at a low level. Monostable multivibrators MM33 and MM34 are arranged to be triggered by the rising edges of their inputs while other monostable multivibrators MM33 and MM34 are arranged to be triggered by the falling edges of their inputs. The illustration includes inverters IN1 and IN2; an R-S flip-flop F/F which is arranged to be triggered by the falling edge of the input thereof; an AND gate AND which has two inputs; a two-input NOR gate NOR; and resistors R31 and R32.

In FIG. 21, the resistors R31 and R32 correspond to the mixing circuit A35 of FIG. 17. A signal which is obtained by inverting the phase of an erasing signal current supplied to the FEH is mixed by means of these resistors R31 and R32 into a signal produced from the circuit VIDEO REC in a given ratio. With this phase inverted signal mixed, a portion of a recording current flowing to the head L31 representing the cross-talk from the rotary transformer is cancelled. The resistance values of the resistors R31 and R32 are determined according to the amount of the cross-talk of the rotary transformer.

Referring to the timing chart of FIG. 22, reference symbols AS32 to AS37 denote the control signals for the analog switches AS32 to AS37 respectively. A symbol F/F denotes a control signal for the analog switch AS31. The timing chart shows the states of the output signals of the monostable multivibrators MM31 to MM34 and those of the control signals of the analog switches AS32 to AS37 in relation to the head change-over signal which is synchronized with the rotation phase of the rotary drum.

The operation of the essential parts shown in FIG. 21 is as described below with reference to the timing chart of FIG. 22:

When the level of the head change-over signal 30PG becomes high, the output levels of the monostable multivibrators MM31 and MM32 become high while the levels of the outputs of other monostable multivibrators MM33 and MM34 remain low. The output of the monostable multivibrator MM31 is supplied via the inverter IN2 to the AND gate AND to obtain the logical product of this input of the AND gate and another input which is the signal 30PG. The output of the AND gate AND thus remains at a low level. Accordingly, the control signal for the analog switch AS32 remains at a low level to keep the switch AS32 in an OFF state. Through a process similar to the above, the output of the R-S flip-flop F/F is kept at a high level; the analog switch AS31 remains at an ON state; and the analog switch AS37 in an OFF state. Further, the analog switches AS33 and AS35 are changed to OFF states while analog switches AS34 and AS36 are changed to ON states respectively.

As a result, the output of the circuit FEH OSC is mixed with the current IL31 through the analog switch AS31, the phase inverting circuit A34, the resistors R31 and R32 and the analog switch AS34. The recording current IL31 with which the signal obtained by inverting the phase of the erasing current flowing to the FEH is mixed becomes $(-\Delta IF)+IF=0$, so that the cross-talk from the rotary transformer can be cancelled out. After that, the connecting positions of the analog switches AS31 to AS37 are likewise changed over one after another in the manner as shown in the timing chart of FIG. 22 and the circuit operation is performed as shown in FIG. 20.

The phase inverting circuit A34 shown in FIGS. 17 and 21 is similar to the circuit shown in FIG. 9 and is therefore omitted from description here.

The magnetic recording apparatus arranged according to this invention as described in the foregoing is provided with the phase inverting circuit which is arranged to invert the phase of the erasing signal to be supplied to the FEH and the mixing circuit which is arranged to mix the output signal of the phase inverting circuit with the information signal to be recorded on a magnetic recording medium. In recording, the output of the mixing circuit is supplied to the magnetic head for recording on the magnetic recording medium. In the event that the cross-talk of the erasing signal for the FEH takes place to affect the recording magnetic head through the rotary transformer, the cross-talk can be cancelled out. Therefore, in accordance with this invention, the erasing signal for an erasing head can be effectively prevented from leaking to affect recording by the magnetic head.

What is claimed is:

1. A magnetic recording apparatus including a rotary magnetic head for recording an information signal on a magnetic recording medium and a rotary erasing head arranged to trace the magnetic recording medium ahead of the recording magnetic head so that an information signal recorded on said magnetic recording medium is erased by said rotary erasing head and then an information signal is recorded by said rotary magnetic head, comprising:
    (A) erasing signal generating means for generating an erasing signal to be fed to said rotary erasing head;
    (B) record information signal generating means for generating a record information signal to be fed to said rotary magnetic head;
    (C) first coupling means for electrically coupling said rotary erasing head with said erasing signal generating means to enable the erasing signal generated by said erasing signal generating means to be fed to said rotary erasing head;
    (D) second coupling means for electrically coupling said rotary magnetic head with said record information signal generating means to enable the record information signal generated by said record information signal generating means to be fed to said rotary magnetic head; and (E) record information signal correcting means for correcting said record information signal generated by said record information signal generating means, by using a phase-inverted erasing signal obtained by inverting the phase of said erasing signal generated by said erasing signal generating means in the case where said erasing signal is fed from said erasing signal generating means through said first coupling means to said rotary erasing head during a period when said record information signal is recorded on said magnetic recording medium by said rotary magnetic head and feeding said record information signal through said second coupling means to said rotary magnetic head.

2. A magnetic recording apparatus according to claim 1, wherein said record information signal correcting means includes:
 (a) phase inverting means for inverting the phase of said erasing signal generated by said erasing signal generating means to produce said phase-inverted erasing signal; and
 (b) adding means for adding said record information signal generated by said record information signal generating means with the phase-inverted erasing signal produced by said phase inverting means.

3. A magnetic recording apparatus according to claim 1, wherein said magnetic recording apparatus is aadapted to record a plurality of different kinds of information signals on different areas on said magnetic recording medium.

4. A magnetic recording apparatus according to claim 3, wherein said record information signal generating means is adapted to sequentially generate at predetermined cycles a plurality of kinds of record information signals which correspond to various information signals, respectively.

5. A magnetic recording apparatus according to claim 1, wherein said erasing signal generating means is arranged to generate said erasing signal only in a period when said rotary erasing head is tracing said magnetic recording medium.

6. A magnetic recording apparatus according to claim 1, wherein each of said first and second coupling means includes a rotary transformer.

7. A magnetic recording apparatus including a plurality of rotary magnetic heads in which signals are recorded on a magnetic recording medium by using said rotary magnetic heads, comprising:
 (A) record signal generating means for generating record signals to be fed to said plurality of rotary magnetic heads, respectively;
 (B) a plurality of rotary transformers each of which corresponds to at least one of said plurality of rotary magnetic heads and which are disposed at different positions from each other, said rotary transformers being arranged to electrically couple said plurality of rotary magnetic heads with said record signal generating means, respectively; and
 (C) correcting means for correcting the record signal, during a period when the record signal is fed from said record signal generating means to first and second of said rotary magnetic heads through their respective corresponding rotary transformers to correct the record signal fed to the second rotary magnetic head by using the record signal fed to said first rotary magnetic head.

8. A magnetic recording apparatus according to claim 7, wherein said correcting means includes:
 (A) phase-inverted signal forming means for forming a phase-inverted signal by inverting a phase of the record signal fed from said record signal generating means to said first rotary magnetic head and for outputting the phase-inverted record signal;
 (B) level correcting means for correcting the level of the phase-inverted record signal outputted from said phase-inverted signal forming means and for outputting the corrected signal; and
 (C) adding means for adding the phase-inverted signal having the level corrected by said level correcting means with the record signal fed to said second rotary magnetic head from said record signal generating means.

9. A magnetic recording apparatus according to claim 7, wherein said first rotary magnetic head is a rotary erasing head.

10. A magnetic recording apparatus according to claim 7, wherein said record signal generating means includes erasing signal generating means for generating an erasing signal to be fed to said first rotary magnetic head and record information signal generating means for generating a record information signal to be fed to said second rotary magnetic head.

11. A magnetic recording apparatus having a plurality of rotary magnetic heads including at least one rotary erasing head, for recording signals on a magnetic recording medium by using said rotary magnetic heads, comprising:
 (A) erasing signal generating means for generating an erasing signal to be fed to said rotary erasing head;
 (B) record information signal generating means for generating a record information signal to be fed to a rotary magnetic head other than said rotary erasing head among said plurality of rotary magnetic heads;
 (C) a plurality of rotary transformers each of which corresponds to at least one of said plurality of rotary magnetic heads and which are disposed at different positions from each other, said rotary transformers being arranged to electrically couple said plurality of rotary magnetic heads with said erasing signal generating means or the record information signal generating means, respectively; and
 (D) correcting means for correcting the record information signal generated by said record information signal generating means by using the erasing signal generated by said erasing signal generating means, during a period when the erasing signal is fed to said rotary erasing head from said erasing signal generating means and the record information signal is fed to said rotary magnetic head other than said rotary erasing head among said plurality of rotary magnetic heads from said record information signal generating means.

12. A magnetic recording apparatus having a plurality of rotary magnetic heads including at least one rotary erasing head for recording signals on a magnetic recording medium by using said rotary magnetic heads, comprising:
 (A) erasing signal generating means for generating an erasing signal to be fed to said rotary erasing head; for generating a record information signal to be fed to the rotary magnetic head, other than said rotary erasing head, among said plurality of rotary magnetic heads;

(C) a plurality of rotary transformers each of which corresponds to at least one of said plurality of rotary magnetic heads and which are disposed at different positions from each other, said rotary transformers being arranged to electrically couple said plurality of rotary magnetic heads with said erasing signal generating means or with record information signal generating means;

(D) phase-inverted signal forming means for forming a phase-inverted signal by inverting a phase of the erasing signal fed from said erasing signal generating means to said rotary erasing head, during a period when the erasing signal is fed to said rotary erasing head from said erasing signal generating means and the record information signal is fed to said rotary magnetic head other than said rotary erasing head among said plurality of rotary magnetic heads from said record information signal generating means and for outputting the phase-inverted signal;

(E) level correcting means for correcting the level of the phase-inverted signal outputted from said phase-inverted signal forming means and for outputting the corrected signal; and (F) adding means for adding the phase-inverted signal, the level of which has been corrected by said level correcting means, with the record information signal fed from said record information signal generating means to said rotary magnetic head other than said rotary erasing head among said plurality of rotary magnetic heads.

* * * * *

UNITED STATES PATENT AND TRADEMARK OFFICE
CERTIFICATE OF CORRECTION

PATENT NO. : 4,965,681

DATED : October 23, 1990

INVENTOR(S) : Hiroyuki Takimoto

It is certified that error appears in the above-identified patent and that said Letters Patent is hereby corrected as shown below:

Insert on cover page:

-- [63] Continuation of Serial No. 873,507, January 12, 1986, abandoned --

Col. 3, line 61. Change "leaks" to -- leak --

Col. 7, line 55. Change "at least one" to -- to at least one --

Col. 9, line 3. Delete "-" second occurrence.

Col. 9, line 8. Change "SW32" to -- SW33 --

Col. 9, line 25. Change "then" to -- when --

Signed and Sealed this

Twenty-fourth Day of November, 1992

Attest:

DOUGLAS B. COMER

*Attesting Officer*    Acting Commissioner of Patents and Trademarks